United States Patent
Keyes

(10) Patent No.: US 7,960,978 B2
(45) Date of Patent: Jun. 14, 2011

(54) METHOD FOR PROVIDING LEAK DETECTION IN PRE-INSULATED PIPING

(75) Inventor: Thomas Joseph Keyes, Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 420 days.

(21) Appl. No.: 12/255,210

(22) Filed: Oct. 21, 2008

(65) Prior Publication Data

US 2010/0096021 A1 Apr. 22, 2010

(51) Int. Cl.
*G01R 27/08* (2006.01)

(52) U.S. Cl. .......... 324/694; 138/104; 138/149; 73/49.1

(58) Field of Classification Search ................. 324/694
See application file for complete search history.

(56) References Cited

U.S. PATENT DOCUMENTS

| | | | | |
|---|---|---|---|---|
| 3,882,382 A * | 5/1975 | Johnson | ........................ | 324/694 |
| 4,576,661 A * | 3/1986 | Persson | ........................... | 156/48 |
| 5,795,994 A * | 8/1998 | Kalfa et al. | ................... | 73/29.01 |
| 5,818,241 A * | 10/1998 | Kelly | ............................. | 324/640 |
| 5,854,444 A * | 12/1998 | Fehlhaber | ..................... | 174/84 R |
| 5,996,642 A * | 12/1999 | Noone et al. | .................. | 138/137 |
| 6,112,580 A * | 9/2000 | Hesky | ............................. | 73/49.1 |
| 6,315,497 B1 | 11/2001 | Wittman et al. | ............... | 405/158 |
| 6,978,807 B1 * | 12/2005 | Keyes | ............................ | 138/149 |
| 7,028,717 B1 | 4/2006 | Keyes | ............................ | 138/149 |
| 7,239,246 B2 * | 7/2007 | Picco et al. | ..................... | 340/618 |
| 2001/0018845 A1* | 9/2001 | Roberts | ............................. | 73/40 |
| 2010/0073012 A1* | 3/2010 | Inoue et al. | .................... | 324/551 |

* cited by examiner

*Primary Examiner* — Melissa J Koval
*Assistant Examiner* — Benjamin M Baldridge
(74) *Attorney, Agent, or Firm* — Charles D. Gunter, Jr.

(57) ABSTRACT

A method is shown for providing status detection, in particular leak detection, in a pre-insulated pipeline for the transportation of media, in particular, steam or hot water. The pipeline has an inner medium-carrying pipe, a surrounding heat-insulating layer of bonded foam, and an outer protective polyolefin jacket. A special length of polymer coated wire is included as a part of the normal bare conductor wire which is used as a part of the electrical sensing system of the pipeline and is used to by-pass various obstructions in the foamed insulation of the pipeline. The insulated length of the coated wire is heat fused at points of egress and ingress through the outer polymeric jacket with the compatible materials of the coated wire and jacket forming a water tight seal.

17 Claims, 3 Drawing Sheets

METHOD FOR PROVIDING LEAK DETECTION IN PRE-INSULATED PIPING

BACKGROUND OF THE INVENTION

1. Field of the Invention

The present invention relates to pie-insulated piping systems, and more specifically to a method for installing components of a leak detection system for detecting a leak in a section of piping in the case of a breakdown of the insulation in the presence of water or other contaminants or under thermal movement stresses, or the like.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water or steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. There are predominantly two types of piping systems in use: Class-A drainable dryable testable (DDT); and polyurethane or polyisocyanurate "bonded" foam systems. Both of these systems use an inner carrier pipe to convey fluid. Although steel is commonly used for the inner pipe which carries the media to be piped, copper or aluminum or other metals as well as fiberglass, PVC, and similar materials may be utilized, as well. The present application is directed toward the "bonded" foam type system. These systems utilize a steel pipe to convey fluid. Around the outside of the steel pipe is a layer of insulating foam such as, for example, polyisocyanurate foam. Around the outside of the foam is a jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket do not move relative to the inner pipe. In the Class-A type system, on the other hand, the insulated inner pipe is designed to move independently of the associated outer jacket. In fact, there is an air gap between the inner pie and outer carrier pipe in the class-A type system.

Various factors can affect the integrity of the bonded foam type pre-insulated piping system. For example, environmental factors which may adversely affect the integrity of the insulated system include floods, high water tables, cooling and condensation, and the like. In the case of high temperature steam lines, temperature differentials can cause the pipeline to expand and contract over time, thereby stressing the jacket and insulating material. The protective jacket of the insulated pipeline may also be punctured inadvertently by maintenance or construction operations, as where another utility line is being installed in the immediate vicinity. If the outer protective jacket is penetrated for any reason, ground water and water vapor may enter the piping system and contact the hot carrier pipe, in the case of a high temperature system, thereby creating steam. The steam will slowly boil away the foam insulation, which may result in ultimate failure of the system.

For the above reasons, various types of pipe monitoring systems have been used in the past for status detection, and in particular leak detection, in pipelines of the type under consideration. For district heating installations of the type described, leak detection and signaling has most often been accomplished by means of metallic conductors which are embedded in the thermal insulation of the pipelines. When a leak occurs, the location of the defect can then be found out by resistance measurement or also transit time measurement. The metallic conductors are usually formed of copper or Ni/Cr and usually take the form of bare wires which are incorporated into the thermal insulation which surrounds the carrier pipe, running along the length of the pipe. As previously mentioned, this insulation will generally consist of either polyurethane or polyisocyanurate foam, with the bare wires being typically incorporated into the foam during the foaming operation as apart of the pipe manufacturing operation.

During the pipeline construction phase, i.e., field installation of the pre-insulated piping, it is necessary to join successive lengths of pipe and pipe components to form the complete pipeline distribution system. The typical field installation will necessarily involve accessory or adjunct components, such as elbows, Tees, water stops, earth anchors, and the like. The electrical conductors used in the leak detection system must necessarily be connected together to provide a complete circuit, even where the insulating materials of the associated pipes are interrupted at, for example, a water stop, or other pipe component connection location.

In the case of a physical obstruction in the insulating materials of the type presented by, for example, a water stop or anchor, one method for continuing the leak detection circuit would be to provide a hole or aperture in the water stop or anchor to allow the circuit wire to pass through the obstruction. However, providing a hole in any part of the metal of the pipeline construction, such as a water stop, presents a potential leak path, making this a less than desirable solution, even if the hole is sealed in some manner at the time of the installation. It is always possible that the hole could leak over time, allowing water to pass the water stop, thereby allowing steam to eat away at the foam insulation on the other side of the water stop.

One commercially available system which is intended to address the problem of circuit continuity is sold in Europe as the ISOPLUS®, by Fjernvarmeteknik A/S of Denmark. The method for installing this system employs three separate steps. The first is the insertion of a rigid 90° fitting into the exterior of the protective jacket of the piping. Secondly, a conductive wire is connected to the fitting with a heavy duty cable. Thirdly, the wire is sealed to the fitting by heat shrinking a small tubular sleeve around the connection area.

While the above technique avoids the necessity of drilling a hole in the metal component of the pipeline which forms the obstruction, the 90° fitting interrupts the otherwise basically uniform contour of the exterior surface of the pipeline. The fitting can be bent or broken during field installation or can become entangled with other equipment. The process itself of installing the fitting and associated wiring is time consuming and labor intensive, adding significantly to the cost of the installation.

Accordingly, one object of the present invention is to provide a method for leak detection in pre-insulated piping, which avoids the problems with leak signaling conductors and circuitry of the type located in the thermal insulation surrounding the carrier pipe in the past, and which permits leakage points or regions to be reliably and accurately located.

Another object of the invention is to provide an improved method for installing the leak detection circuitry in a pre-insulated piping system of the type which requires the circuitry to be distributed over a run of pipeline by way of lines which run in the thermal insulation surrounding the carrier pipe, where the circuitry must also by-pass or traverse accessory or adjunct components of the pipeline, such as water stops, anchors, and the like.

Another object of the invention is to provide such an improved method of leak detection which is simple in design and economical to manufacture, as compared to existing systems in use in the marketplace today.

SUMMARY OF THE INVENTION

The present invention has as its general purpose to provide a technique and method for allowing the ingress and egress of a conductor wire in a section of pre-insulated piping where a barrier component is located at a selected location along the length of the piping, otherwise interrupting the path of travel of the conductor wire, which method satisfies the previously described deficiencies.

This object is accomplished by providing an underground piping system capable of servicing high temperatures in which a metal carrier pipe is insulated by a surrounding layer of foamed insulation. A first and second length of insulated and jacketed pipe are provided, each having a joining end to be joined to an end of the other length. Each of the pipe lengths comprises an inner metal pipe having an interior surface and an exterior surface. An envelope of foamed insulation is applied so that it surrounds the inner pipe exterior surface. An outer protective polyolefin jacket surrounds the envelope of insulation. The joining ends of adjacent pipe lengths are affixed, as by being welded together, to form fixed joints, whereby the adjacent pipe lengths provide a continuous fluid conduit for conveying high temperature fluids.

The piping system in question also includes at least one barrier component which is located at a selected location along the length of joined pipe in the piping system. The barrier component is installed on the exterior surface of the inner carrier pipe and has at least one vertical component extending outwardly therefrom which interrupts the envelope of foamed insulation surrounding the inner carrier pipe at the selected location. The barrier component could be, for example, a water stop or an earth anchor.

A conductor wire passes through the foamed insulation between the outer protective jacket and the inner carrier pipe, generally parallel to the axis of the joined pipe. In the method of the invention, selected lengths of the conductor wire are provided with an extruded polymeric coating which is compatible with the material of the outer protective polymeric jacket surrounding the envelope of foamed insulation. An opening is provided in the outer protective polymeric jacket at a location adjacent the barrier component with the length of polymer coated wire being joined to the length of bare conductor wire and passed out of the opening and around the barrier component. A second, similar opening is formed on an opposite side of the barrier component with a similar length of the coated wire being passed through the second opening and back into the foamed insulation of the pipeline where it is again joined to the length of bare conductor wire passing down the pipeline. The two openings in the outer protective jacket are then fused so that the polymeric coating of the selected length of wire fuses with the material of the polymeric protective jacket of the pipeline to thereby seal the respective pipe openings. The result is a length of insulated conductor wire which passes out of the piping, around the barrier component and back into the piping. The conductor wire which is located within the foamed insulation of the pipeline may form a portion of an electrical circuit, including external components for sensing characteristics of the pipeline, such as moisture and leak detection.

Additional objects, features and advantages will be apparent in the written description which follows.

DETAILED DESCRIPTION OF THE INVENTION

Figure 1:
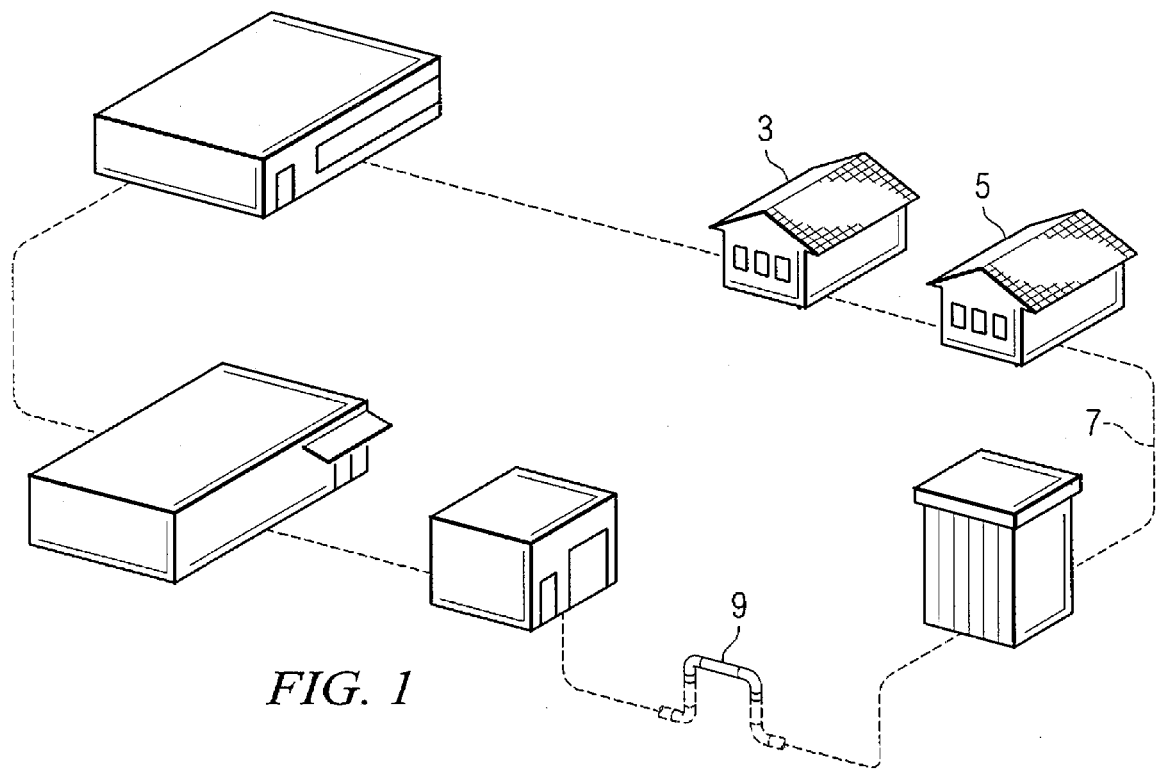
FIG. 1 is a simplified representation of a typical distributed piping system of the type under consideration utilizing hot water or steam for heating.
Figure 2:
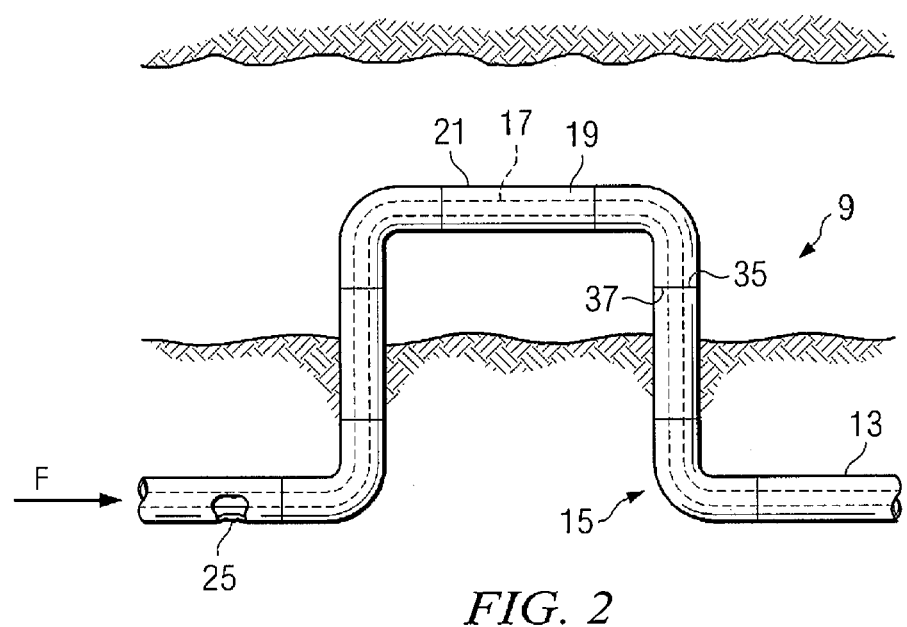
FIG. 2 is a schematic representation of an expansion loop in a pre-insulated pipeline prior to thermal expansion.

Turning first to FIGS. 1-2, there is illustrated a typical environment showing a pre-insulated piping system of the type which might employ the method of the invention. FIG. 1 shows a school campus having a number of isolated buildings 3, 5 connected by an underground insulated pipeline 7 carrying steam and which also includes a right angle expansion loop 9.

FIG. 2 is a close-up view of the loop 9 of FIG. 1. As will be appreciated, the loop includes a number of coaxially oriented lengths of pipe, such as length 13 (shown broken away in FIG. 2). The installation may also include a number of angled fittings such as the right angle elbows (generally shown as 15) in FIG. 2. Each length of pipe includes an inner pipe 17, typically formed of steel, an envelope of foamed insulation 19 surrounding the inner pipe and outer protective jacket 21 surrounding the envelope of insulation. The joining ends (shown generally as 35, 37 in FIG. 2) of adjacent pipe lengths are affixed, as by being welded together, to form fixed joints, whereby the adjacent pipe lengths provide a continuous fluid conduit for conveying high temperature fluids. The following references, among others, teach the manufacture of such prior art systems: U.S. Pat. Nos. 3,793,4111; 4,084,842; and 4,221, 405, all to Stonitsch et al.; as well as U.S. Pat. Nos. 6,547,908 and 5,736,715, both assigned to Thermacor Process, LP, the assignee of the present invention, The reference in this discussion to pipe "lengths" is intended to refer to standard available factory pre-insulated piping of the type previously described having an inner metal pipe surrounded by an envelope of foamed insulation which, in turn, is contained within a polyolefin jacket. As referred to briefly above, typical commercial practice involves the use of steel, copper, aluminum or alloy conveying pipes. The surrounding insulation is typically open or closed cell polyurethane, polyisocyanurate, or polystyrene foamed rigid insulation. The outer protective jacket is usually formed of a polyolefin material such as polypropylene, polybutylene, polyethylene, high density polyethylene (HDPE), polyvinylchloride and similar protective jackets.

Pipelines of the type under consideration are especially useful in conveying high temperature fluids, such as steam. The term "high temperature", as used in this discussion, means that the pipelines are conveying fluids at temperatures above ambient, typically at temperatures of 212° F. and above. In some cases, temperatures of 350° F. and higher will be encountered. The expected operating temperature of the pipeline will determine the type of outer foam insulation utilized. For example, 250° F. is the present temperature limitation at which polylethane foam is used in bonded foam systems. Temperatures above 250° F. require the use of higher temperature foams, such as polyisocyanurate foam, Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System. The published specifications for systems are as follows:

| Carrier Pipe- | |
|---|---|
| diameter less than about 2" | A53 ERW Grade B, Std. Wt. Black Steel |
| diameter greater than about 2" | A106 SML, Std. Wt. Black Steel |
| HDPE Jacket- | |
| Compatible with ASTM D3350 | |
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |
| Polyisocyanurate Insulation- | |
| Density | >2.4 lbs/ft$^3$ |
| "K" Factor | ≦0.14 @ 70° F., ≦0.24 @ 406° F. |
| Compressive Strength | >30 psi |
| Closed Cell Content | ≧90% |
| Minimum Thickness | ≧2.5" @ 366° F., ≧3.0" @ 406° F. |

While the above described systems represent a substantial advance in the art of pre-insulated piping, whatever the choice of insulating materials, various environmental factors can nevertheless affect the integrity of such systems. As previously discussed, a manufacturing defect or an installation defect can compromise the integrity of the system. Similarly, at a later date, the outer protective jacket can be cut or damaged due to maintenance crews installing additional underground utilities. If the outer protective jacket is compromised for any reason, ground water contacting the inner steel carrier pipe boils and creates steam which, in turn, can eat away the surrounding foam insulation.

Because of this potential danger, it is customary to install accessory or adjunct components, such as so-called "water stops," in the pipeline at various intervals. The water stop serves to prevent or limit damage of the above type which might be caused by the penetration of the outer protective jacket of the piping system and the subsequent intrusion of water or other contaminants. The water stop is used to isolate a section of piping in a piping system of the type shown in FIGS. 1-3 where a problem has occurred and the integrity of the pipe insulation has been breached at one or more locations along the overall length of the pipeline. For example, a water stop could be used to isolate the breach illustrated as 25 in FIG. 2 from sections of the pipeline upstream or downstream of the breached location, as by installing the water stop 39 at the top of the loop 15 in FIG. 3.

The water stop 39 will typically be located in the pipeline at a point in the overall piping system where there is likely to be no relative movement between the inner carrier pipe, insulating layer and outer protective jacket. A preferred location for a water stop, such as water stop 39, is thus within an expansion loop, such as loop 15 in FIG. 3. Then, even if foam disbondment or some other failure has occurred in the pipeline upstream or downstream, the expansion loop acts absorb such force. The water stop 39 would act to compliment these actions in isolating any water damage which might occur.

Another type of accessory or adjunct component of pre-insulated piping systems is the earth anchor. Anchors are used to prevent movement of the pipeline due to thermal expansion, which movement might cause separation of the bonded foam from the inner carrier pipe. This type of separation presents a potential leak path in the system. An earth anchor is illustrated schematically at 8 in FIG. 1, and will be discussed in further detail with respect to FIGS. 5 and 6 of the drawings.

Because pre-insulated pipe systems usually entail a large investment, a leak from the carrier pipe or penetration of water into the pipe insulation should be discovered and localized as quickly as possible. As a result, it is common practice to employ electrical leak monitoring and detection circuitry in pre-insulated piping systems of the type under consideration. A typical monitoring system consists of one or more small (on the order of 1.5 mm) uninsulated copper wires which are embedded in the insulation surrounding the pipe, which run along the length of the pipeline, and which are connected at some point to an external alarm unit. When moisture is present in the bonded foam insulation, the resistance between the alarm wire and the supply pipe decreases causing an alarm to be activated in a central monitoring unit. In some systems, the position of the fault is also located with the help of a measuring instrument which sends an electric pulse through the system. When the pulse detects a fault a reflection is sent back to the measuring instrument. As the velocity of the pulse is known the position of the fault can then theoretically be calculated.

Figure 3:
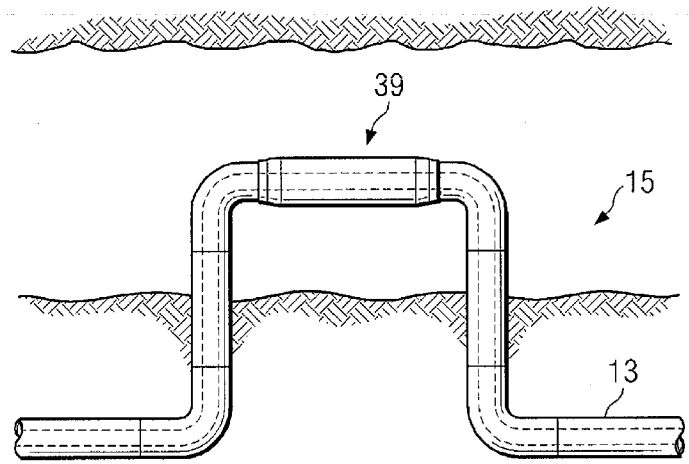
FIG. 3 is an isolated view of a loop similar to the loop of FIG. 2, but with a water stop installed therein.

Leak detectors are thus used to help ensure that a pre-insulated piping system provides a long and satisfactory service life by helping to make sure that the insulation is kept dry, thereby preventing corrosion of the inner steel carrier pipe and boiling away of the surrounding bonded foam insulation. Leak detection equipment of the type under consideration is available from a number of commercial sources and will be familiar to those skilled in the relevant pre-insulated piping arts. As one example, a system is commercially available from CWA Systems AB, of Tyresco, Sweden, as the CWA 9000™ LEAK DETECTION IN PIPING SYSTEM. The CWA 9000 is an automatic leak detection/location system for a pre-insulated piping system which sends defined pulses on a conductor wire or cable. Any break, leak or other type of fault, is immediately detected by the alarm unit, stored in a battery-backed memory, and automatically output to a display unit. The unit can also be connected to a main computer, allowing the alarm communication to be output over a telephone line, a separate communication cable or via radio link, GSM or satellite. The units can be configured in different ways depending on the application, type of liquid, environment, power supply or communication protocol used, With reference now to FIGS. 3 and 4, there is shown a loop 15 in the piping system of FIGS. 1 and 2 which has installed therein a water stop 39. The water stop will be used as a typical example of the situation in which the method of the invention can best be employed. The piping system shown in FIG. 3, again incorporates a first and second length of insulated and jacketed pipe, each having a joining end to be joined to and end of the other length, as discussed with respect to FIG. 2. The pipeline shown in FIG. 3 is thus identical to the previously described piping system illustrated in FIGS. 1 and 2 with the exception of the water stop 39 which is inserted at a selected location within the length of the piping system.

Figure 4:
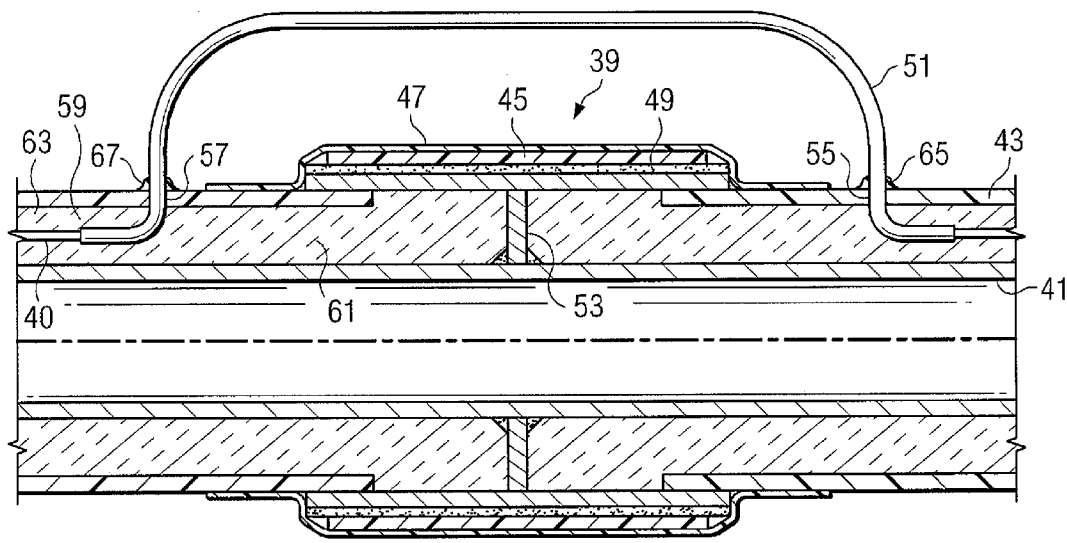
FIG. 4 is a side, cross-sectional view of the water stop of FIG. 3, also showing the regions adjacent the water stop having leak detection circuitry which employs the by-pass technique of the method of the invention.

As best seen in FIG. 4, the previously mentioned bare conductor wire 40 of the leak detection circuitry runs through the bonded foam insulation 61 generally parallel to the inner carrier pipe 41. The water stop 39 includes a centrally located disk 53 which surrounds the inner carrier pipe at a selected location and which extends radially outwards generally perpendicular to the pipe in a direction toward the outer jacket 43. In the example illustrated, the disk 53 is about 3/16-3/8 inches thick and is formed of a suitable metal, such as steel, whereby the disk forms a region which is impervious to the passage of water so that it forms a water stop. The particular water stop 39 happens to include the accompanying outer wrap layers 45, 47, 49 as described in Applicant's issued U.S. Pat. No. 7,028,717, issued Apr. 18, 2006. However, the water stop could take the form of any other conveniently available water stop used in the industry, as well.

It will be apparent from FIG. 4 that the presence of the water stop 39 and, in particular the radially extending disk 53, forms a "barrier component" with respect to the conductor wire 40 of the leak sensing system. In other words, the disk 53 of the water stop constitutes a vertical component extending outwardly from the carrier pipe which interrupts the envelope of foamed insulation surrounding the inner carrier pipe at the selected location. One way of traversing the barrier component would be to provide a hole in the disk 53, thereby allowing the wire 40 to continue its path of travel along the longitudinal axis of the pipe 41. However, as has been noted, the presence of a hole in the disk 53 presents a potential leak point or other potential weak point in the water stop installation.

Applicant's inventive method provides a simple and inexpensive technique for circumventing an obstruction in the pipeline of the type presented by a water stop or earth anchor by allowing the bare wire 40 to circumvent the barrier component and yet, at the same time, provide a water proof point of egress and ingress for the conductor wire. In accordance with the method of the invention, at least selected lengths (51 in FIG. 4) of the conductor wire 40 are provided with an external polymeric coating which is compatible with the polymeric material of the outer protective polymeric jacket (43 in FIG. 4) surrounding the envelope of foamed insulation 61 to thereby form a selected length of polymer coated wire. For example, in the installation illustrated, the bare copper wire 40 is coated with a length of high density polyethylene. The coating can be accomplished in any convenient manner, for example, by extruding the coating over the bare copper wire using a conventional wire extrusion line.

In order to implement the method, a first opening 55 is provided in the outer protective polymeric jacket 43 at a location adjacent the barrier component. The length of polymer coated wire 51 located downstream of the bare conductor wire passed out of the first opening 55 and around the barrier component, in this case disk 53.

Next, a second, similar opening 57 is formed on an opposite side of the barrier component and a remaining length of the polymer coated wire 51 is fed through the opening 57. The point 59 in FIG. 4 indicates the end of the polymeric coating with the remaining length of bare conductor wire 40 passing on down the length of the pipeline.

In order to complete the installation, the two openings 55, 57 are fused so that the polymeric coating of the selected length of wire 51 fuses with the material of the polymeric protective jacket 43 of the pipeline to thereby seal the respective pipe openings. This can most conveniently be accomplished by heat fusing the coated wire 51 and jacket openings 55, 57. The fused areas are indicated at 65. 67 in FIG. 4. This can be accomplished by using a commercially available electric fusion welder, or by other convenient means. The electric fusion welder heats the existing polymer coated wire and jacket materials to the appropriate fusion temperature while also dispensing a quantity of fresh polyethylene to the fusion region. Because these areas are fused, the materials essentially become "as one", forming an essentially impervious water tight seal at the points of egress and ingress.

The installation shown in FIG. 4 assumes that the wire is installed at the manufacturing plant during the manufacture of the pipe so that the bare wire 40 and coated wire length 51 are installed prior to or simultaneously with the installation of the foam layer 61. It will be understood, however, that an existing section of pipe could be retrofitted using the method of the invention, by drilling holes 55, 57, locating the bare copper wire 40 in the foamed insulation, and by splicing the coated wire into the circuit as shown in FIG. 4.

Figure 5:
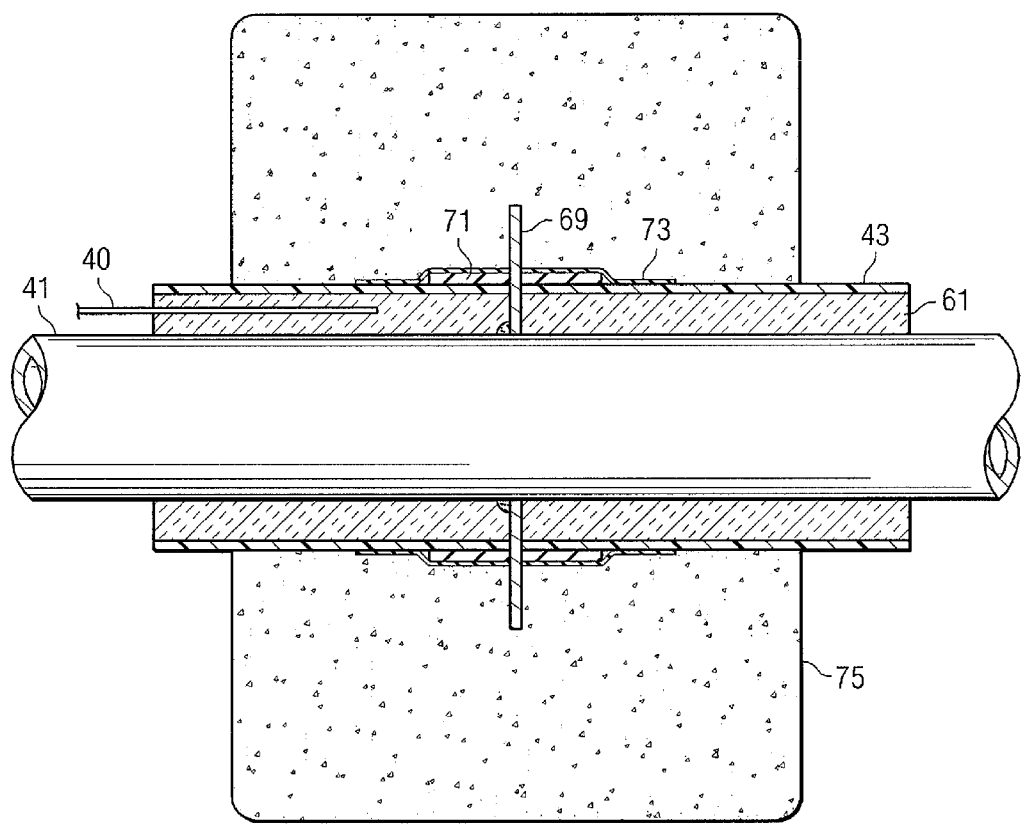
FIG. 5 is a side, partial cross-sectional view of a traditional earth anchor of the type used in a distributed piping system of the type shown in FIG. 1.
Figure 6:
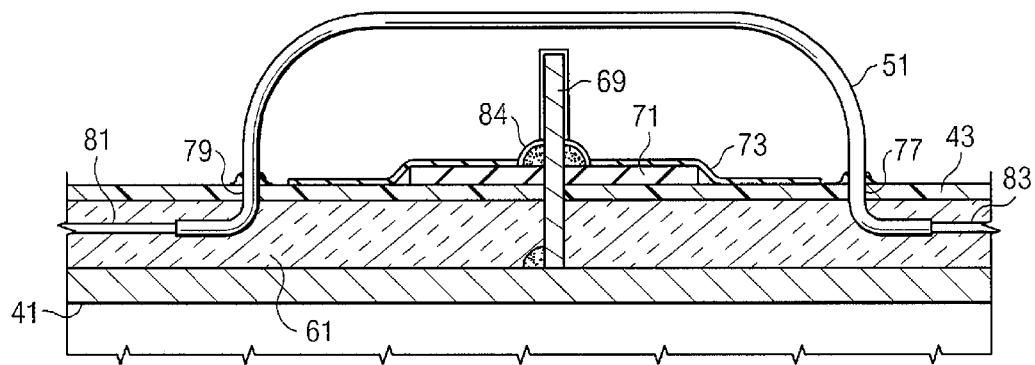
FIG. 6 is a close up view of a portion of the earth anchor of FIG. 5 but also showing the installation of leak detection circuitry using the by-pass technique of the invention.

FIGS. 5 and 6 illustrate another type of obstruction for the conductor wire of the leak detection system, in this case an earth anchor. The same type of carrier pipe 41 with surrounding foamed insulation layer 61 has an anchor plate 69 extending radially outward from the length of piping. A steel ring 71 is also welded to the anchor plate 69. A water shed ring 84 forms a continuous weld region to the plate 69 and to the ring 71. Heat shrink tape 73 is used to seal the ring to the jacket 43. A concrete anchor block 75 surrounds the assembly. A length of bare copper conductor wire is illustrated at 40 in FIG. 5.

FIG. 6 shows the same anchor in closer detail and with the leak detection circuitry of the invention in place. Once again, a first and second holes 77, 79 are provided in the jacket 43 so that the polymer coated section of wire 51 can again be used to connect the bare copper wires 81, 83, running through the foamed insulation 61. The polymer coated wire is again fused to the outer HDPE jacket 43 at the points of egress and ingress 77, 79, so that the openings are completely sealed and watertight.

An invention has been provided with several advantages. The method of the invention allows a continuous run of leak detection circuitry, or other sensing circuitry, to continue uninterrupted about various types of obstructions such as water stops and earth anchors in a pre-insulated pipeline. Leak detection equipment can then be used to identify and isolate a faulty section of the pipeline so that water or other contaminate intrusion travels only a fixed length or distance and so that prolonged exposure does not result in corrosion of the inner carrier pipe. The system incorporates several existing, commercially available materials or components, thereby simplifying assembly. The technique is simple to implement in a variety of pre-insulated piping installations and requires less time and labor to install than other presently available systems.

While the shown has been shown in only one of its forms, it is not thus limited but is susceptible to various change and modifications without departing from the spirit thereof.

What is claimed is:

1. A method of providing electrical continuity in an electrical circuit used in an insulated piping system which conveys high temperature fluids, the method comprising the steps of:

providing at least a first and second length of insulated and jacketed pipe, each having a joining end to be joined to an end of the other length, each pipe length comprising an inner carrier pipe having an interior surface and an exterior surface, an envelope of foamed insulation surrounding the inner pipe exterior surface, and an outer protective polymeric jacket surrounding the envelope of insulation, the joining ends of adjacent pipe lengths being welded together to form fixed joints, whereby the adjacent pipe lengths provide a continuous length of fluid conduit for conveying high temperature fluids;

wherein at least one barrier component is located at a selected location along the length of joined pipe in the piping system, the barrier component being installed on the exterior surface of the inner carrier pipe and having at least one vertical component extending outwardly therefrom which interrupts the envelope of foamed insulation surrounding the inner carrier pipe at the selected location;

passing a bare conductor wire through the foamed insulation between the outer protective jacket and the inner carrier pipe, generally parallel to the axis of the joined pipe;

providing a selected length of conductor wire with a polymeric coating which is compatible with the material of the outer protective polymeric jacket surrounding the envelope of foamed insulation to thereby form a selected length of polymer coated wire having exposed, bare conductor wire extending from either of opposite ends thereof;

providing an opening in the outer protective polymeric jacket at a location adjacent the barrier component and passing a portion of the length of polymer coated wire out of the opening and around the barrier component;

forming a similar opening on an opposite side of the barrier component and passing a remaining length of the coated wire through the similar opening and back into the foamed insulation of the pipeline;

heat fusing the two openings so that the polymeric coating of the selected length of coated wire fuses with the material of the polymeric protective jacket of the pipeline to thereby seal the respective pipe openings;

connecting the bare ends of the conductor wire to an external electrical circuit.

2. The method of claim 1, wherein the barrier component is a water stop.

3. The method of claim 1, wherein the barrier component is an earth anchor.

4. The method of claim 1, wherein the barrier component is installed in a loop of piping.

5. The method of claim 1, wherein the polymeric coating on the conductive wire and the polymeric protective jacket of the pipe line are both formed of an extruded polyolefin.

6. The method of claim 5, wherein the polyolefin is high density polyethylene.

7. The method of claim 1, wherein the barrier component takes the form of a centrally located disk which surrounds the inner carrier pipe generally perpendicular thereto at a selected location and which extends radially outward toward the outer protective jacket, the centrally located disk being formed of a material which is impervious to the passage of water.

8. The method of claim 1, wherein the foam insulation is selected from the group consisting of polyurethane foams and high temperature polyisocyanurate foams.

9. The method of claim 1, wherein the lengths of insulated piping are part of a pipeline conveying steam, hot water or other hot fluids at a temperature above about 212° F.

10. A method of providing leak detection in a section of pre-insulated piping having an outer protective jacket to provide an indication of the ingress of water or other contaminants in the case of a breach in the outer jacket, the method comprising the steps of:

providing a first and second length of insulated and jacketed pipe, each having a joining end to be joined to an end of the other length, each pipe length comprising an inner metal pipe having an interior surface and an exterior surface;

applying an envelope of foamed insulation which surrounds the inner pipes exterior surface and envelopes the inner pipes;

locating a bare conductor wire within the foamed insulation between the outer protective jacket and the inner carrier pipe, generally parallel to the axis of the joined pipe, the wire being located within the foamed insulation during the foaming of the insulation;

applying an outer protective jacket which surrounds the envelope of insulation, the joining ends of adjacent pipe lengths being welded together to form fixed joints, whereby the adjacent pipe lengths provide a continuous fluid conduit for conveying high temperature fluids;

installing at least one barrier component at a selected location along the length of joined pipe in the piping system, the barrier component being installed on the exterior surface of the inner carrier pipe and having at least one vertical component extending outwardly therefrom which interrupts the envelope of foamed insulation surrounding the inner carrier pipe at the selected location, wherein at least selected lengths of the conductor wire are provided with an extruded coating which is compatible with the material of the outer protective polymeric jacket surrounding the envelope of foamed insulation, and wherein a length of the coated wire is located in a run of the bare conductor wire and is passed through openings which are formed on either of opposite sides of the barrier component, so that the length of coated wire by-passes the barrier component exteriorly of the pipeline;

heat fusing the two openings so that the polymeric coating of the selected length of wire fuses with the material of the polymeric protective jacket of the pipeline to thereby seal the respective pipe openings;

connecting the bare conductor wire to an external electrical circuit which includes an indicator of the level of moisture in the foamed insulation.

11. The method of claim 10, wherein the barrier component is a water stop.

12. The method of claim 10, wherein the barrier component is an earth anchor.

13. The method of claim 10, wherein the barrier component is installed in a loop of piping.

14. The method of claim 10, wherein the polymeric coating on the conductive wire and the polymeric protective jacket of the pipe line are both formed of an extruded polyolefin.

15. The method of claim 14, wherein the polyolefin is high density polyethylene.

16. The method of claim 10, wherein the barrier component takes the form of a centrally located disk which surrounds the inner carrier pipe generally perpendicular thereto at a selected location and which extends radially outward toward the outer protective jacket, the centrally located disk being formed of a material which is impervious to the passage of water.

17. The method of claim 10, wherein the foam insulation is selected from the group consisting of polyurethane foams and high temperature polyisocyanurate foams.

* * * * *